March 10, 1925.  1,529,436
O. E. KELLUM
AUTOMATIC CUT-OUT SYSTEM FOR SYNCHRONOUS DRIVES
Filed Sept. 18, 1920
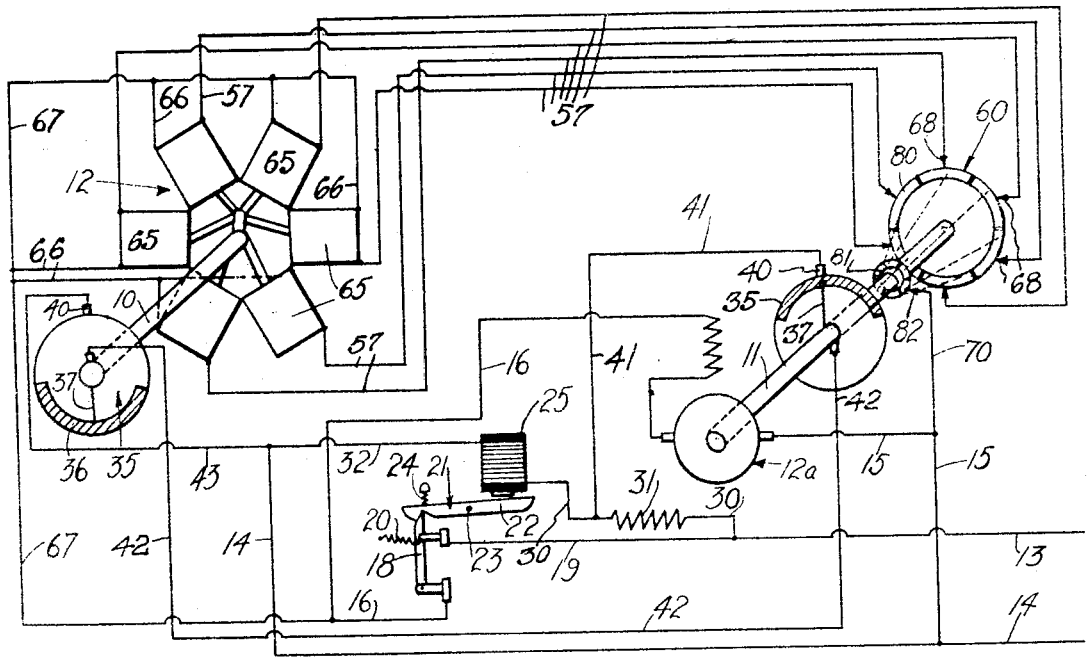
Inventor
Orlando E. Kellum
By
His Attorney Patented Mar. 10, 1925.

1,529,436

UNITED STATES PATENT OFFICE.

ORLANDO E. KELLUM, OF LOS ANGELES, CALIFORNIA.

AUTOMATIC CUT-OUT SYSTEM FOR SYNCHRONOUS DRIVES.

Application filed September 18, 1920. Serial No. 411,216.

*To all whom it may concern:*

Be it known that I, ORLANDO E. KELLUM, a citizen of the United States, residing at Los Angeles, county of Los Angeles, State of California, have invented new and useful Improvements in Automatic Cut-Out Systems for Synchronous Drives, of which the following is a specification.

This invention has to do with an automatic cutout system for synchronous drives and it has for an object the provision of a simple, effective, and reliable system of this character.

In a broad sense the present invention provides means for automatically cutting out the power means in a mechanism embodying two synchronously operating members upon said members getting substantially out of synchronism. The power means may be in the form of a motor mechanism comprising a suitable arrangement or combination of two or more synchronously connected electric motors. The synchronously operating members may be directly or positively connected to the power means and may be operated at any speed or range of speed.

The system provided by the invention is applicable to use in various arts and classes of machinery where it is desired to operate two members in synchronism without directly or positively connecting them, or where it is impractical to directly or positively connect them. Such a circumstance as this is present in a synchronous phonograph and kinetograph mechanism where the phonograph and kinetograph are arranged at considerable distances apart. In this particular application I am merely setting forth a typical manner in which the present system may be carried out, it being understood, of course, that such disclosure of the invention is not to be considered as a limitation or restriction of its scope but is to be understood as typical and for purpose of illustration.

Objects and features of the invention, in addition to those above mentioned, will be best and more clearly understood from the following detailed description of the invention throughout which reference is had to the accompanying drawings in which—

The figure is a diagram illustrating a typical application of the invention. In the diagram there is shown two members or shafts 10 and 11 one, the shaft 11, driven by a motor 12ª and the other, the shaft 10 driven by a motor 12 controlled from a commutator mechanism 60 operated by the shaft 11. The motor 12 and commutator mechanism form a mechanism by which the shaft 10 is controlled to operate in synchronism with the shaft 11. The motor 12ª, which may be any suitable type or form of motor, is connected with the main lead wires 14 and 13 by wire 15 and wire 16, switch 18 and wire 19.

The particular motor 12 which I have shown in the diagram for the purpose of illustrating a form of device such as may be used in the mechanism for connecting the shafts 10 and 11 to operate in synchronism comprises a plurality of solenoids 65, each one of which has a wire 66 connecting with a common wire 67, and has a wire 57 extending to the commutator mechanism 60. The wire 67 connects with wire 16 while the wires 57 connect to brushes 68 which are adapted to cooperate with the contact segments 80 of the commutator mechanism 60. The contact segments 80 of the commutator mechanism 60 are properly connected to contact segments 81 which are adapted to cooperate with a brush 82 which is connected with wire 15 by a wire 70. It will be readily understood from inspection of the diagram how rotation of shaft 11 operates the commutator mechanism 60 to cause successive energization of the solenoids 65 of motor 12 in such manner as to cause rotation of shaft 10 in perfect synchronism with shaft 11. It will be understood, of course, that this particular form of motor 12 and this particular means for controlling and operating the motor 12 from shaft 11 is merely typical and for purpose of illustrating a continuous or connected motor mechanism for operating two shafts in synchronism.

The switch 18 being arranged between the wires 16 and 19 provides a control device for the motors 12 and 12ª. In this particular embodiment of the invention the switch 18 is a knife switch provided with a spring 20 which tends at all times to open it and provided with a catch device 21 for normally holding it closed. The catch device comprises a notched lever 22 pivotally mounted at 23 so that its notched portion cooperates with the movable member or blade of the switch proper. A spring 24 is arranged in connection with the lever 22 to tend at all times to move it out of engagement with the movable part of the switch proper, and an electro-magnet 25 is arranged to normally hold the lever 22 in engagement with the movable part of the switch to keep the switch mechanism closed. In this particular form of the invention the electro-magnet 25 is adapted to be normally energized in order to hold the lever 22 in the manner just described and is therefore carried in a circuit which is connected to the main circuit carried by the main lead wires 13 and 14. The circuit which carries the electro-magnet is carried by a wire 30 which connects one side of the electro-magnet with the wire 13, and by a wire 32 which connects the other side of the electro-magnet with wire 14. In the preferred arrangement resistance 31 is carried in wire 30 as clearly shown in the diagram. With the mechanism thus far described it will be understood how the electro-magnet 25 normally holds the switch mechanism 18 closed thereby keeping the motor circuits closed and causing the motors 12 and 12$^a$ to continuously operate. Further it will be obvious that de-energization of the electromagnet 25, sufficiently to allow the lever 22 to be moved by spring 24, will allow the switch 18 to be opened by spring 20, thereby opening the motor circuits and causing the motors 12 and 12$^a$ to cease operation.

In accordance with the present invention the energization of the electromagnet 25 is controlled by the operation of the shafts 10 and 11. Mounted on each of the shafts 10 and 11 is a commutator mechanism 35 which has a contact segment 36 extending a little less than half way around it, or a little less than 180° around it. The contact segments 36 are connected to the shafts 10 and 11 by wires 37. Each of the commutator mechanisms 35 embodies a brush 40 that is fixed, or stationary, and which engages the movable portion of the commutator in such manner as to contact with the contact segment 36 each revolution of the shaft for slightly less than a half a revolution of the shaft. In this particular form of the invention the shafts 10 and 11 are positioned, before the mechanism is started, so that the contact segments 36 of the two commutator mechanisms are opposite each other relative to the brushes 40, or in other words so that one of the contact segments 36 contacts with its cooperating brush while the other contact segment is out of contact with its cooperating brush 40. The relative positioning of the brushes and contact segments is clearly illustrated in the diagram. Now, if the shafts 10 and 11 are rotated by the motors 12 and 12$^a$ in synchronism with each other, the relative positioning of the parts of each of the commutator mechanisms 35 will remain unchanged, and at no time will both of the contact segments be in engagement with the cooperating brushes 40. The reason the contact segments 36 and brushes 40 will not simultaneously contact, when the shafts 10 and 11 are in proper relative positions and operating synchronously, is because of the fact that the contact segments 36 are slightly less than 180° in length, or in other words, because the contact segments do not overlap. Now if for any reason the shafts 10 and 11 get out of synchronism, that is, if one of the shafts gets slightly ahead or behind the other, immediately the above mentioned relative positioning of the two commutator mechanisms 35 becomes disturbed, and if the two shafts get out of synchronism a sufficient amount the commutator mechanisms will get in such relative positions that both of the contact segments and brushes will be in contact at certain times. It may be stated that the amount that the two commutator mechanisms 35, and therefore shafts 10 and 11, can get out of synchronism without causing simultaneous contacting of both contact segments and brushes, will depend upon the length or size of the contact segments, or upon the amount that the contact segments are less than 180°, and upon the size of the brushes 10. For instance, when the brushes are narrow and the contact segments 36 are both only a few degrees short of being 180° in length it is necessary for the two shafts to get only slightly out of synchronism in order to cause the above mentioned action. When the segments 36 are both contacting with their respective brushes 40 a circuit is closed between the wire 30 and the wire 14. This circuit is carried by a wire 41, extending from a point on the wire 30, between the electro-magnet 25 and resistance 31, to the brush 40 of the commutator mechanism 35 mounted on shaft 11, by the contact 36 and wire 37 of said commutator mechanism 35, by a wire 42 connecting the shaft 11 and the shaft 10, by the wire 37 and contact 36 of the commutator mechanism mounted on shaft 10, and by wire 43 which connects the brush 40 of said last mentioned commutator mechanism with the wire 14. It will be obvious from the diagram, that this last mentioned circuit is in parallel with the circuit in which the electromagnet 25 is carried and it will be understood how closing of the circuit through the commutator mechanisms 35 causes a short circuit around the electro-magnet 25 thereby causing partial deenergization of the electro-magnet 25. In practice there is sufficient deenergization of the electro-magnet 25 by this action to cause the lever 22 to be moved by spring 24, thereby allowing the switch 18 to be opened. The opening of the switch 18, as above described, opens the circuits in which the motors are carried and thus cuts off both of the motors. From the foregoing description it will be obvious that lack of synchronism of the shafts 10 and 11 for any reason whatsoever will cause closing of the circuit carrying the commutator mechanisms 35 thereby causing partial deenergization of the circuit carrying the electro-magnet 25 thus causing opening of the switch mechanism 18 and cutting off the motors 12 and 12ª. The motors having been cut off the shafts 10 and 11 can be reset and the switch 18 again closed to re-establish operation of the motors 12 and 12ª.

The arrangement of the resistance 31 in wire 30 is desirable in that it provides resistance in the circuits which carry the electro-magnet 25 and the commutator mechanisms 35 and thereby prevents short circuiting through these circuits in such manner as to open any circuit breakers or to blow any fuses that there may be in the main circuit. The resistance 31 when arranged as illustrated in the diagram does not interfere with the deenergization of the electro-magnet as it offers the same resistance to the circuit carrying the electro-magnet as it does to the circuit carrying the commutator 35.

In this particular disclosure of the invention I have shown a form of the invention wherein the electromagnet 25 is normally energized in order to hold the control switch closed. The particular advantage of this form of mechanism is that the switch 18 is opened and the entire mechanism cut off in the event that the main circuit is cut off, say for instance momentarily, for any reason whatsoever.

Having set forth only a preferred embodiment of my invention I do not wish to limit myself to the specific details hereinabove set forth but wish to reserve to myself any modifications or variations that may appear to those skilled in the art or that may fall within the scope of the following claims.

Having described a preferred form of my invention, I claim:

1. In combination two motors adapted to operate in synchronism, and means for controlling one of the motors when the motors get out of synchronism, said means comprising a switch, an electro-magnet for actuating the switch, an electric circuit for energizing the electro-magnet, and an electric circuit for effecting the energization of the first mentioned circuit and controlled by the motors.

2. In combination two motors adapted to operate in synchronism, and means for controlling one of the motors when the motors get out of synchronism, said means comprising a switch, an electro-magnet for actuating the switch, an electric circuit for energizing the electro-magnet, and an electric circuit in parallel with the first mentioned circuit to effect the energization of said first mentioned circuit and controlled by the motors.

3. In combination two motors adapted to operate in synchronism, and means for controlling one of the motors when the motors get out of synchronism, said means comprising a switch adapted to be held closed, an electro-magnet for actuating the switch, an electric circuit for the electro-magnet and adapted to be normally energized to hold the switch closed, and a second electric circuit in parallel with the first mentioned electric circuit and adapted to be closed when the motors get out of synchronism and thereby cause deenergization of the first mentioned circuit and releasement of the switch.

4. In combination with two shafts, primary driving motor for one shaft, a driving motor for the other shaft and means operated and controlled by the primarily driven shaft to energize and control said driving motor to rotate the second mentioned shaft synchronously with the primarily driven shaft; means for controlling one of the motors when the shafts get out of synchronism, comprising a switch controlling energy supply to the motor, and means controlling the switch and embodying a circuit controlled by the two shafts.

5. In combination with two shafts, primary driving motor for one shaft, a driving motor for the other shaft and means operated and controlled by the primarily driven shaft to energize and control said driving motor to rotate the second mentioned shaft synchronously with the primarily driven shaft; means for controlling one of the motors when the shafts get out of synchronism, comprising a switch controlling energy supply to the motor, and means controlling the switch and embodying a circuit and two commutator mechanisms one on each shaft.

In witness that I claim the foregoing I have hereunto subscribed my name this 8th day of September, 1920.

ORLANDO E. KELLUM.

Witness:
VIRGINIA BERINGER.